United States Patent

[11] 3,620,563

| [72] | Inventor | George W. Pierce |
| --- | --- | --- |
| | | 340 W. 29th Ave., Eugene, Oreg. 97405 |
| [21] | Appl. No. | 867,497 |
| [22] | Filed | Oct. 20, 1969 |
| [45] | Patented | Nov. 16, 1971 |

[54] LOCKING LINK
1 Claim, 4 Drawing Figs.

| [52] | U.S. Cl. | 294/82 |
| --- | --- | --- |
| [51] | Int. Cl. | B64d 17/38 |
| [50] | Field of Search | 294/104, 83, 75, 78, 82 |

[56] References Cited
UNITED STATES PATENTS

| 271,116 | 1/1983 | Rairigh | 294/83 |
| --- | --- | --- | --- |
| 1,280,273 | 10/1918 | Moore | 294/83 |
| 3,038,753 | 6/1962 | Seager | 294/83 |
| 3,454,296 | 7/1969 | Long | 294/83 X |

FOREIGN PATENTS

| 360,191 | 11/1931 | Great Britain | 294/83 |
| --- | --- | --- | --- |

*Primary Examiner*—Richard E. Aegerter
*Assistant Examiner*—Douglas D. Watts
*Attorney*—Eckhoff and Hoppe ABSTRACT: A locking link structure is provided having a hooklike member at one end with an arcuate keeper located on the tang portion of the hook. The arcuate keeper is pivoted to the hook in such a manner so that as a link is placed within the hook, the arcuate member will be automatically turned into locking engagement so that the link will not slip out of the hook. A detent is provided having two positions one of which tends to hold the arcuate member open and the other which tends to hold the arcuate member closed. In a preferred embodiment, the opposite end of the link is provided with a distortable open ring structure whereby it can be permanently hooked to a chain or the like.

PATENTED NOV 16 1971　　3,620,563

INVENTOR.
GEORGE W. PIERCE

BY
ATTORNEYS

LOCKING LINK

SUMMARY OF THE INVENTION

The present invention relates to a link member wherein one end of the link member can be more or less permanently attached to a chain or the like and the opposite end can be readily attached or detached from a chain, cable, rope or the like. A hook is provided for ready attachment of the link to a chain and the tang of the hook is provided with a pivoted arcuate member. In the open position, the arcuate member has its inner surface or bight spaced from the bight of the hook so that when a link is placed in the hook, pressure is exerted first against the arcuate member before it is exerted against the hook proper. As pressure is placed on the arcuate member, it swings from its open position into a locking position so that there is no danger of the chain or the like being accidentally dislodged from the hook. Detents are provided which normally hold the arcuate member at either an open or a closed position, greatly facilitating use of the device.

The structure of the present invention can be readily formed of two simple steel stampings held together by a rivet, and preferably with a spring washer, tending to restrain movement of the arcuate member.

In a preferred embodiment of the invention, a simple-locking end structure is providing for the opposite end of the link so that it can be more or less permanently attached to a chain or the like. However, by simply distorting the metal, it is possible to remove the link from the chain if this is desired.

DESCRIPTION OF THE PREFERRED EMBODIMENT

Figure 1:
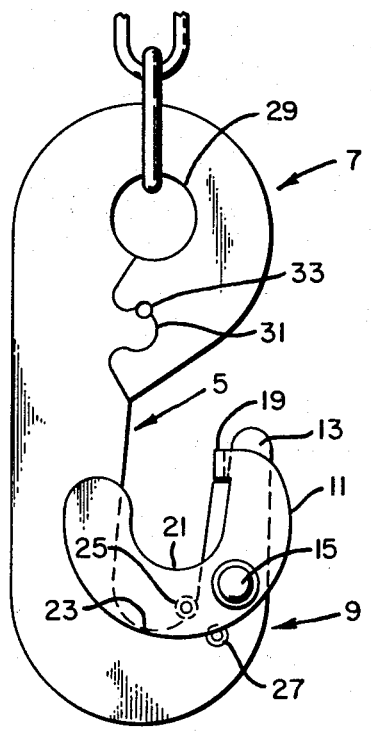
FIG. 1 is a front view of a locking link connector embodying the present invention. In this view, the arcuate member is shown in an open position.

Referring now to the drawings by reference characters, the locking link of the present invention has a center section generally designated 5, a connecting ring section generally designated 7 and a hook section generally designated 9. The locking link can be stamped out of steel or other suitable material.

The hook section 9 is designed for rapid attachment or detachment from the link of a chain or the like. For this purpose, it is highly desirable that a means be provided so that after the hook is hooked onto a chain it will stay locked into position and the chain will not bounce out of the hook. At the same time, it is desirable to provide means whereby the hook can be simply detached from the chain when this is desired. In accordance with the present invention this is accomplished by means of an arcuate member 11 which is pivoted to the tang 13 of the hook 9 by means of a pivot 15. Preferably the pivot 15 takes the form of a rivet having a spring washer 17 thereon so that the arcuate member will tend to stay in any position but can be moved readily to any other desired position. One end of the arcuate member has a bent-over portion 19 which engages the tang of the hook and prevents it from swinging completely around. Preferably the tang 13 is notched as at 14 to receive the bent over portion 19 and provide a smooth inner surface for the hook.

As can best be seen in FIG. 1, the throat 21 of the arcuate member is spaced above the throat or bight 23 of the hook while the pivot point 15 is off to one side. At the same time, the turned over portion 19 of the arcuate member 11 is engaged with the tang 13 of the hook, preventing it from swinging out of position. To further prevent it from swinging, the arcuate member has a small projection 25 thereon which can be either a dimple in the metal or can be a rivet head. This projection 25 engages the inner surface of the throat 23 of the hook, holding the hook in the normally open position shown in FIG. 1. Displaced from this open position, is a small depression 27 in the hook itself, the purpose of which will be later apparent.

Figure 3:
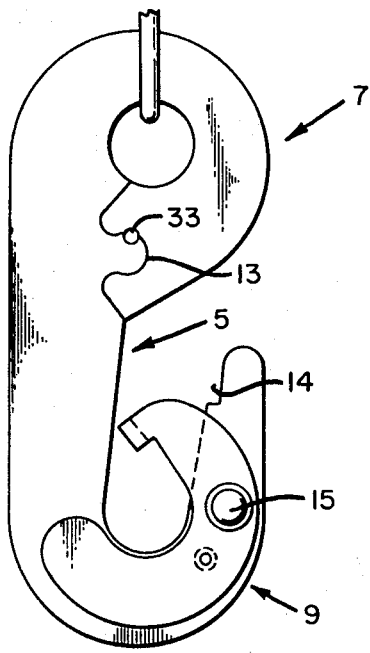
FIG. 3 is a view similar to FIG. 1 but showing the arcuate member in a closed position.
Figure 4:
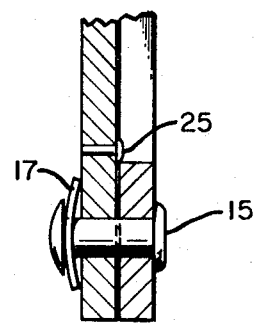
FIG. 4 is an enlarged sectional view on the line 4—4 of FIG. 2.

If a link is now placed in the hook, it will engage the throat 21 of the arcuate member and not the hook proper. Pressure against the arcuate member will cause the arcuate member to move in a counterclockwise direction to the position shown in FIG. 3. The springiness of the metal and also the action of the spring washer 17, will allow the projection 25 to pass over the surface of the hook until it drops into the depression 27. The arcuate member is now locked in the position shown in FIG. 3 by means of the projection 25 engaging the opening 27 so that the link or the like will not readily be dislodged. However, if it is desired to open the link, this can be readily done simply by grasping the projection 19 and swinging the arcuate member back into the position shown in FIG. 1.

Figure 2:
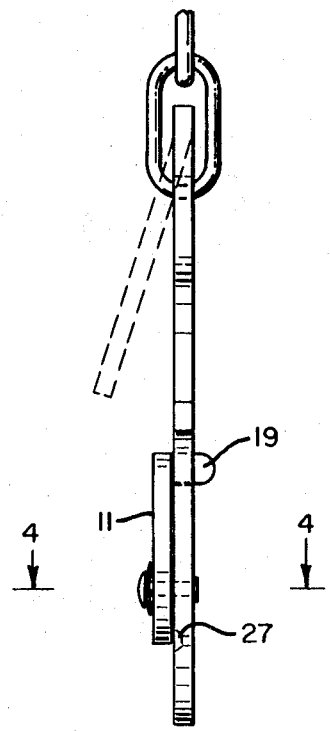
FIG. 2 is a side view of the connector shown in FIG. 1.

The opposite end of the connecting link has the ring connector 7, previously mentioned. This takes the form of a central opening 29 which, at its center surface, is connected to the body 5 by means of a single cut 31, preferably of a reentrant configuration. When it is desired to connect this end of the link to a chain, the metal can be distorted, as is shown in dash lines in FIG. 2, to one side, the link inserted and the metal sprung back into place. This provides a substantially permanent connection to a chain or the like yet, if desired, it can be readily removed from the chain and reused in another application. A hole 33 may be provided in cut 31 so that a rivet can be inserted to lock the link in place.

It is believed apparent in the foregoing that I have provided a simple and effective locking link which can be made from two simple metal stampings which can be readily attached to a chain and readily detached, all without the danger of the link being accidentally detached.

I claim:

1. A safety hook having a shank and a tang which are approximately parallel with each other with a bight portion therebetween, comprising in combination:
   a. an arcuate member pivoted at about the center of said arcuate member and near the bottom end of said tang, displaced slightly from said bight,
   b. a bent-over end on one end of said arcuate member,
   c. a cutout portion on the inner surface at the end of said tang, said bent-over portion of the arcuate member fitting into said cutout portion, whereby the end of the arcuate member and the inner surface of said tang form a substantially smooth surface,
   d. said arcuate member being adapted to move into two positions, namely a first position wherein the arcuate member forms a smooth continuation with said tang and wherein the bottom surface of said arcuate member is displaced from said bight and a second position wherein one end of said arcuate member lies substantially in line with said bight and the opposite end of arcuate member substantially closes said hook,
   e. spring means at the pivot preventing easy movement of said arcuate member and a first detent tending to hold said arcuate member in said first position and a second detent tending to hold said arcuate member in said second position.

* * * * *